(12) United States Patent
Yamamoto

(10) Patent No.: US 12,594,913 B2
(45) Date of Patent: Apr. 7, 2026

(54) BRAKING CONTROL DEVICE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 599 days.

(21) Appl. No.: 18/026,948

(22) PCT Filed: Sep. 30, 2021

(86) PCT No.: PCT/JP2021/036185
§ 371 (c)(1),
(2) Date: Mar. 17, 2023

(87) PCT Pub. No.: WO2022/071502
PCT Pub. Date: Apr. 7, 2022

(65) Prior Publication Data
US 2023/0303042 A1      Sep. 28, 2023

(30) Foreign Application Priority Data
Sep. 30, 2020      (JP) ................................. 2020-166220

(51) Int. Cl.
*B60T 7/12*          (2006.01)
*B60T 8/172*         (2006.01)
(52) U.S. Cl.
CPC ................ *B60T 7/12* (2013.01); *B60T 8/172* (2013.01); *B60T 2230/04* (2013.01)
(58) Field of Classification Search
CPC . B60T 8/32; B60T 8/171; B60T 8/172; B60T 7/12; B60T 7/22; B60T 2230/04;
(Continued)

(56) References Cited

U.S. PATENT DOCUMENTS

2007/0150134 A1*   6/2007  Yamamoto ................ B60T 7/22
                                                          701/29.5
2015/0274145 A1*  10/2015  Ando ........................ B60T 7/22
                                                          701/70
(Continued)

FOREIGN PATENT DOCUMENTS

JP          2016028913 A       3/2016

OTHER PUBLICATIONS

International Search Report (PCT/ISA/210) with translation and Written Opinion (PCT/ISA/237) mailed on Dec. 7, 2021, by the Japan Patent Office as the International Searching Authority for International Application No. PCT/JP2021/036185. (8 pages).

*Primary Examiner* — Robert A. Siconolfi
*Assistant Examiner* — San M Aung
(74) *Attorney, Agent, or Firm* — BUCHANAN INGERSOLL & ROONEY PC

(57)                    ABSTRACT

A braking control device executes pre-stop braking control to adjust a braking force when a vehicle stops. The pre-stop braking control includes reduction control that reduces the braking force, and increase control that is executed before the reduction control is started, to increase the braking force. An increasing unit executes the increase control, and a reducing unit executes the reduction control. A calculation unit calculates a braking distance extended by the reduction control, as an extended distance, and calculates a braking distance shortened by the increase control, as a shortened distance. The calculation unit calculates the extended distance to become longer when an operation amount of a braking operation member operated by a driver is reduced during braking than when the operation amount is not reduced. When a difference between the extended distance and the shortened distance is less than a determination value, the reducing unit starts the reduction control.

6 Claims, 5 Drawing Sheets

(58) Field of Classification Search
      CPC ........... B60T 2201/022; B60T 2240/00; B60T
                            2210/32
      USPC .......................................................... 303/20
      See application file for complete search history.

(56) References Cited

U.S. PATENT DOCUMENTS

| | | | |
|---|---|---|---|
| 2015/0307103 A1 * | 10/2015 | Kuroki .................... | B60T 13/52 |
| | | | 701/70 |
| 2018/0265081 A1 * | 9/2018 | Yoneda ............. | B60W 30/0956 |
| 2019/0232965 A1 * | 8/2019 | Watanabe ................. | B60T 7/12 |
| 2020/0223407 A1 * | 7/2020 | Yasui ................... | G05D 1/0257 |

* cited by examiner

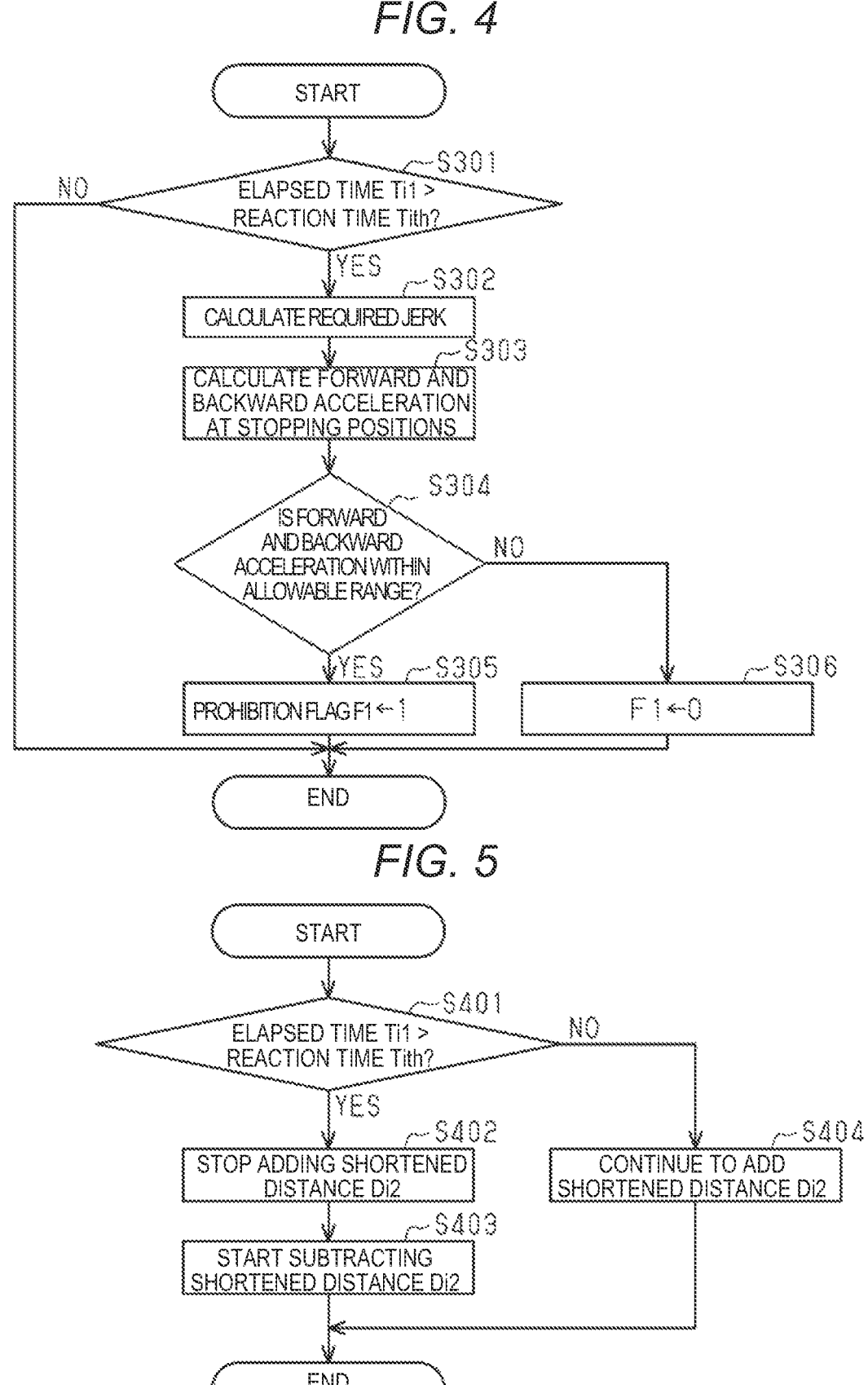

*FIG. 4*

START

↓

S301

ELAPSED TIME Ti1 > REACTION TIME Tith?

NO →

YES

S302

CALCULATE REQUIRED JERK

↓

S303

CALCULATE FORWARD AND BACKWARD ACCELERATION AT STOPPING POSITIONS

↓

S304

IS FORWARD AND BACKWARD ACCELERATION WITHIN ALLOWABLE RANGE?

NO →

YES

S305

PROHIBITION FLAG F1 ← 1

S306

F1 ← 0

↓

END

*FIG. 5*

START

↓

S401

ELAPSED TIME Ti1 > REACTION TIME Tith?

NO →

YES

S402

STOP ADDING SHORTENED DISTANCE Di2

S404

CONTINUE TO ADD SHORTENED DISTANCE Di2

↓

S403

START SUBTRACTING SHORTENED DISTANCE Di2

↓

END

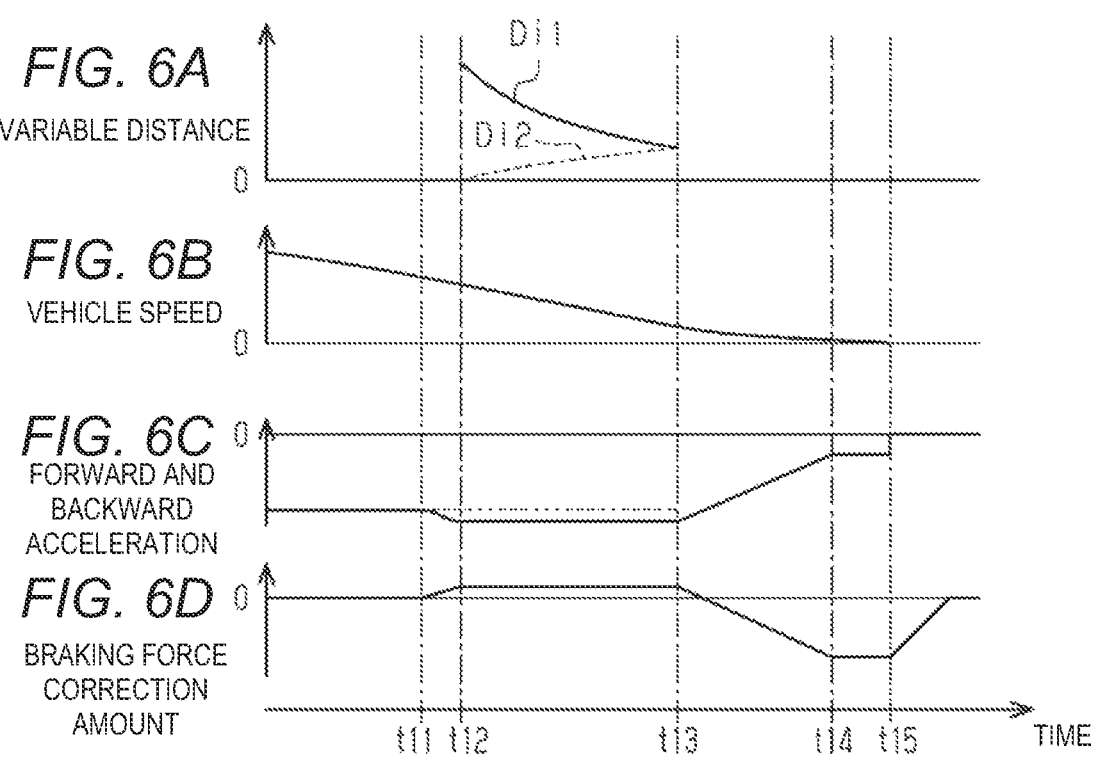
FIG. 6A
VARIABLE DISTANCE
FIG. 6B
VEHICLE SPEED
FIG. 6C
FORWARD AND
BACKWARD
ACCELERATION
FIG. 6D
BRAKING FORCE
CORRECTION
AMOUNT
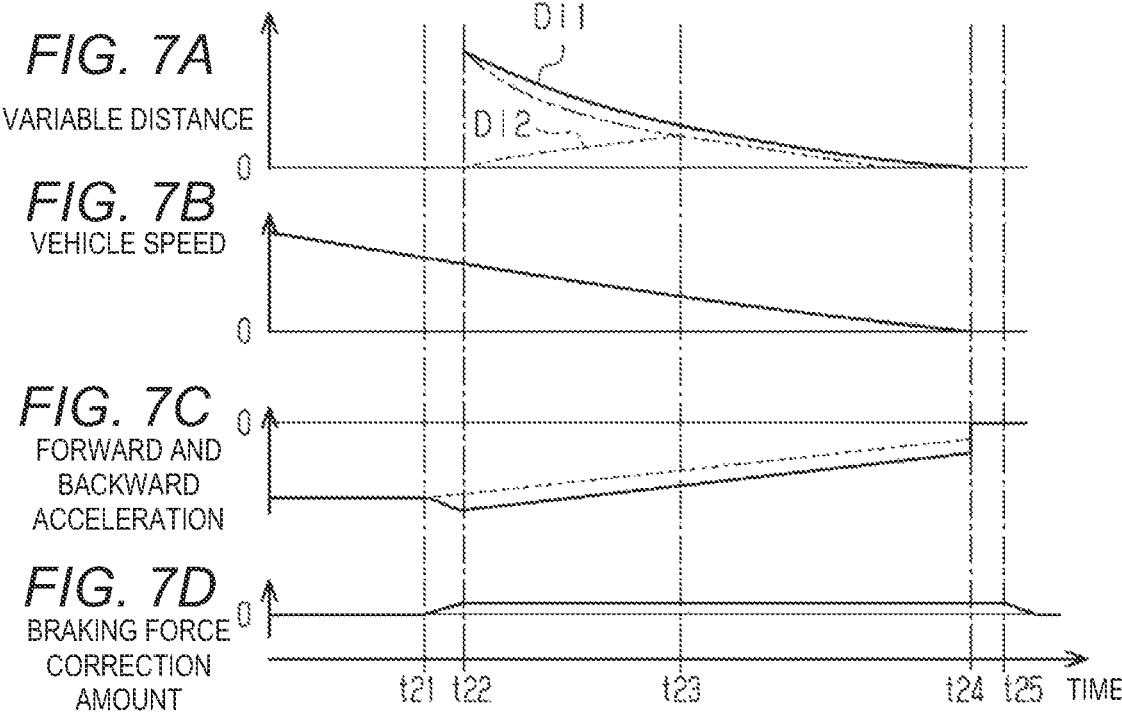
FIG. 7A
VARIABLE DISTANCE
FIG. 7B
VEHICLE SPEED
FIG. 7C
FORWARD AND
BACKWARD
ACCELERATION
FIG. 7D
BRAKING FORCE
CORRECTION
AMOUNT

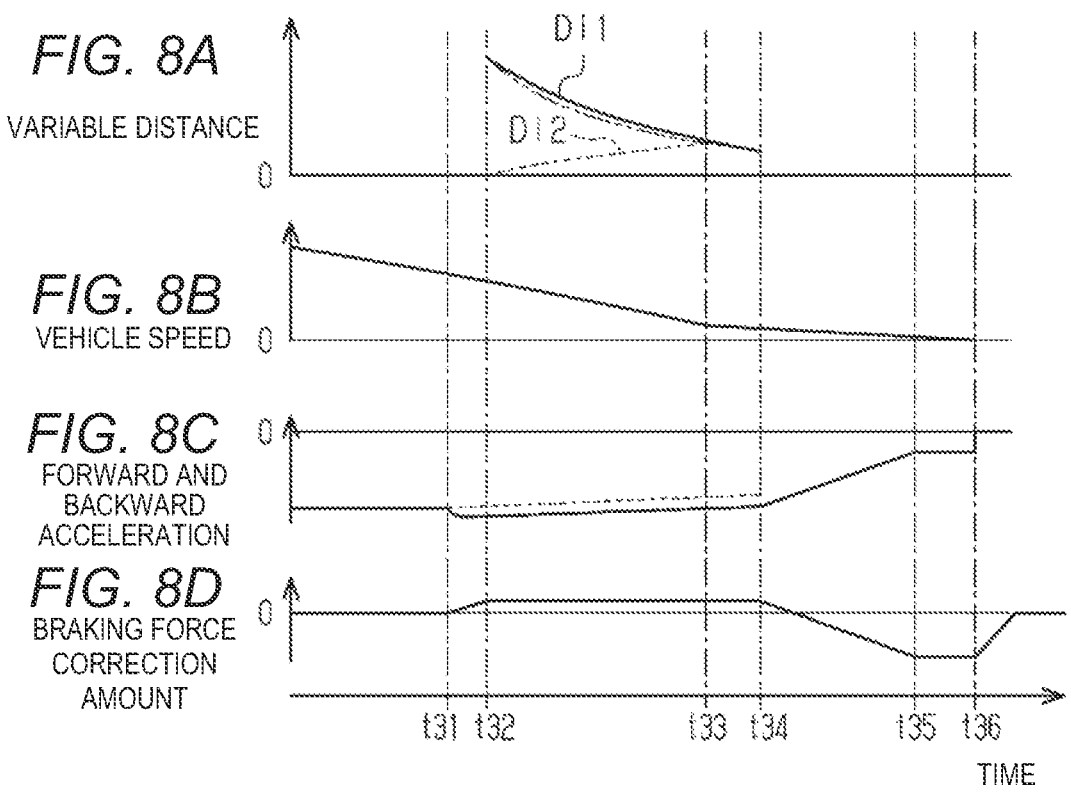
*FIG. 8A*
VARIABLE DISTANCE
*FIG. 8B*
VEHICLE SPEED
*FIG. 8C*
FORWARD AND
BACKWARD
ACCELERATION
*FIG. 8D*
BRAKING FORCE
CORRECTION
AMOUNT
TIME
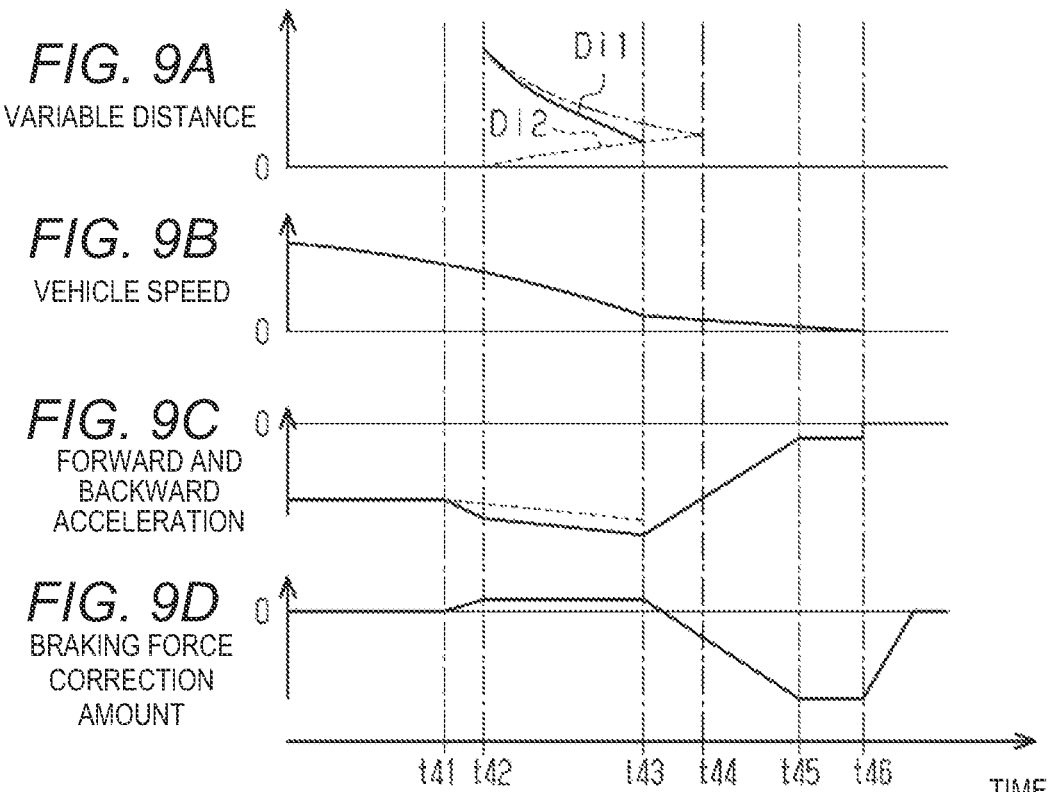
*FIG. 9A*
VARIABLE DISTANCE
*FIG. 9B*
VEHICLE SPEED
*FIG. 9C*
FORWARD AND
BACKWARD
ACCELERATION
*FIG. 9D*
BRAKING FORCE
CORRECTION
AMOUNT
TIME

BRAKING CONTROL DEVICE

TECHNICAL FIELD

The present disclosure relates to a braking control device for a vehicle.

BACKGROUND ART

PTL 1 discloses a control device that performs control of a braking force when a vehicle stops. The control device causes a reduction in the amount of change in forward and backward acceleration immediately before the vehicle stops, by causing a reduction in the braking force immediately before the vehicle stops.

CITATION LIST

Patent Literature

PTL 1: JP2016-28913A

SUMMARY

Technical Problem

In the control device described in PTL 1, since the braking force immediately before the vehicle stops is reduced, the braking distance is increased, which is a concern. Further, the case where when the braking force is controlled immediately before the vehicle stops, the operation amount is changed by a driver has not been sufficiently considered.

Solution to Problem

According to one aspect, in order to solve the foregoing problems, there is provided a braking control device that executes pre-stop braking control to adjust a braking force of a vehicle when the vehicle is stopped by braking in a case where a braking operation member is operated by a driver of the vehicle, the braking control device including: a reducing unit that executes reduction control to reduce the braking force applied to the vehicle, below a required braking force that is a braking force corresponding to an operation amount of the braking operation member, during the pre-stop braking control; an increasing unit that executes increase control to increase the braking force above the required braking force before the reduction control is started during the pre-stop braking control, so as to increase an extended distance that is an estimated value of a distance by which a braking distance when the braking force is reduced by the execution of the reduction control is extended than a braking distance when the reduction control is not executed; and a calculation unit that calculates a shortened distance that is an estimated value of a distance by which a braking distance when the braking force is increased by the execution of the increase control is shortened than a braking distance when the increase control is not executed, and the extended distance during the execution of the increase control. The calculation unit calculates the extended distance such that the extended distance becomes longer when the operation amount is reduced during the braking of the vehicle than when the operation amount is not reduced. When a difference between the extended distance and the shortened distance is less than a determination value, the increasing unit ends the increase control, and when the difference between the extended distance and the shortened distance is less than the determination value, the reducing unit starts the reduction control.

According to this configuration, it is possible to suppress the increase in the extended distance by executing the increase control before the reduction control. Namely, it is possible to reduce the amount of change in forward and backward acceleration immediately before the vehicle stops, while suppressing the extension of the braking distance. Further, in this configuration, when the difference between the extended distance and the shortened distance is less than the specified determination value, the increase control is ended and the reduction control is started. Since an operation of the driver is reflected in the calculation of the extended distance, it is possible to reflect an operation by the driver of the vehicle at the time that the reduction control is started. Accordingly, the braking distance that reflects the operation of the driver is easily realized.

In order to solve the foregoing problems, according to one aspect, there is provided a braking control device that, in a vehicle that decelerates due to an operation of a braking operation member by a driver of the vehicle, executes reduction control to reduce a braking force applied to the vehicle regardless of the operation of the braking operation member when the vehicle is about to stop, in order to suppress a behavior of the vehicle associated with a stopping of the vehicle, and increase control to increase the braking force applied to the vehicle regardless of the operation of the braking operation member in a period before an execution period of the reduction control, in order to compensate for a braking distance of the vehicle extended by the execution of the reduction control, the braking control device including: an accumulation unit that accumulates an operation amount of the braking operation member before the execution of the reduction control is started; and a control unit that starts to execute the reduction control based on the operation amount of the braking operation member accumulated by the accumulation unit.

BRIEF DESCRIPTION OF DRAWINGS

FIG. 4 is a flowchart illustrating the flow of a processing executed by the same braking control device during execution of the increase control in the pre-stop braking control.

FIG. 5 is a flowchart illustrating the flow of a calculation process for a shortened distance executed by the same braking control device.

FIGS. 6A-6D are a timing chart illustrating a transition of a braking force controlled by the same braking control device when the vehicle stops.

FIGS. 7A-7D are a timing chart illustrating a transition of the braking force controlled by the same braking control device when the vehicle stops.

FIGS. 8A-8D are a timing chart illustrating a transition of the braking force controlled by the same braking control device when the vehicle stops.

FIGS. 9A-9D are a timing chart illustrating a transition of the braking force controlled by the same braking control device when the vehicle stops.

DESCRIPTION OF EMBODIMENTS

Hereinafter, one embodiment of a braking control device will be described with reference to FIGS. 1 to 9.

Figures 1, 2:
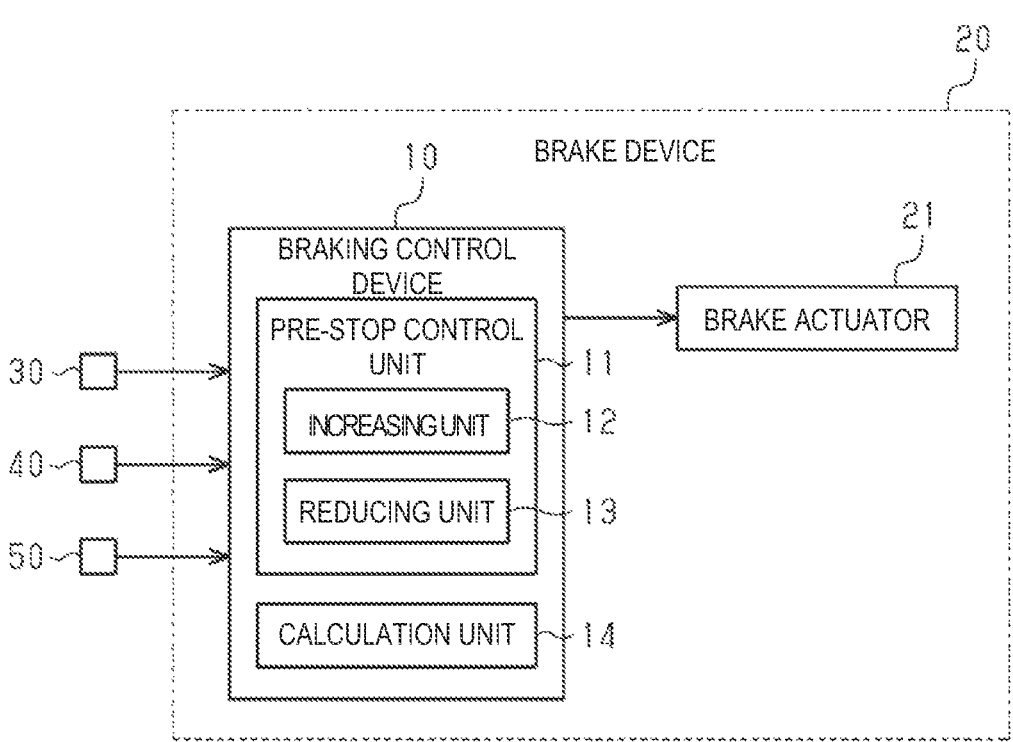
FIG. 1 is a block diagram illustrating one embodiment of a braking control device applied to a brake device.
FIG. 2 is a flowchart illustrating the flow of a processing when the same braking control device executes pre-stop braking control.

A brake device 20 illustrated in FIG. 1 is installed on a vehicle. The brake device 20 includes a braking control device 10 and a brake actuator 21. The braking control device 10 can adjust a braking force applied to wheels of the vehicle by controlling operation of the brake actuator 21.

The vehicle on which the brake device 20 is installed includes various sensors that detect states of the vehicle. Detection signals from the various sensors are input to the braking control device 10. The vehicle includes a monitoring device 50 that monitors a driver. Information acquired by the monitoring device 50 is input to the braking control device 10.

As illustrated in FIG. 1, the vehicle includes an operation amount sensor 30 as one of the various sensors. The operation amount sensor 30 detects an operation amount BR of a braking operation member operated by the driver of the vehicle. The braking operation member is operated by the driver when braking the vehicle. One example of the braking operation member is a brake pedal. In this case, the operation amount sensor 30 is a pedal force sensor that detects a force with which the brake pedal is depressed, as the operation amount BR. A required braking force is calculated as a target value of a braking force corresponding to the operation amount BR, based on a detection signal from the operation amount sensor 30.

The vehicle includes a wheel speed sensor 40 as one of the various sensors. The wheel speed sensor 40 is attached to each corresponding wheel of the vehicle. A speed of each wheel of the vehicle is calculated based on a detection signal from the wheel speed sensor 40. A vehicle speed that is a speed of the vehicle is calculated based on the speed of each wheel.

The monitoring device 50 has the function of acquiring information about the driver of the vehicle. The monitoring device 50 includes a camera disposed in the interior of the vehicle. The monitoring device 50 includes an information processing unit that processes an image captured by the camera. For example, the monitoring device 50 can estimate an age of the driver by analyzing the captured image via the information processing unit. The monitoring device 50 can determine whether the driver is in an inattentive state, based on the captured image. The monitoring device 50 is not limited to including the camera, and may include a device that monitors the driver. For example, the monitoring device 50 may include a measurement device that measures a driver's pulse. The driver's pulse can be used as an indicator of a state of tension of the driver. The pulse can also be used as an indicator of a state of health of the driver. Namely, the monitoring device 50 may acquire a state of tension of the driver. The monitoring device 50 may acquire a state of health of the driver.

The braking control device 10 and the information processing unit provided in the monitoring device 50 may have any one of the following configurations (a) to (c). (a) One or more processors that execute various processes according to a computer program are provided. The processor includes a CPU and memories such as a RAM and a ROM. The memories store program codes or commands configured to cause the CPU to execute processes. The memories, namely, computer-readable media include any available media that can be accessed by a general-purpose or dedicated computer. (b) One or more dedicated hardware circuits that execute various processes are provided. The dedicated hardware circuit is, for example, an application specific integrated circuit (ASIC) or a field programmable gate array (FPGA), or the like. (c) A processor that executes some of various processes according to a computer program and a dedicated hardware circuit that executes the remaining of the various processes are provided.

The braking control device 10 includes a pre-stop control unit 11 and a calculation unit 14 as functional units. The pre-stop control unit 11 includes an increasing unit 12 and a reducing unit 13.

The pre-stop control unit 11 executes pre-stop braking control to adjust the braking force when the vehicle is stopped by braking. The pre-stop control unit 11 executes the pre-stop braking control when a braking operation member is operated by the driver of the vehicle. The pre-stop braking control includes a reduction control executed by the reducing unit 13, and increase control executed by the increasing unit 12. The pre-stop control unit 11 executes the increase control before the reduction control is started.

The reducing unit 13 causes the braking force applied to the vehicle, to decrease below the required braking force in the reduction control. The reduction control includes control that maintains the braking force at a value smaller than the required braking force.

The increasing unit 12 causes the braking force applied to the vehicle, to increase above the required braking force in the increase control. The increase control includes control that maintains the braking force at a value larger than the required braking force.

The calculation unit 14 calculates a reaction time Tith. The reaction time Tith indicates an estimated value of the time required for the driver to recognize a variation in the braking force with respect to the required braking force when the adjustment of the braking force is started by the braking control device 10. The calculation unit 14 calculates the reaction time Tith based on a standard value set in advance and on information about the driver that can be acquired by the monitoring device 50. An example of the standard value is a value less than one second. For example, the calculation unit 14 sets the reaction time Tith to a value larger than the standard value as the estimated age of the driver increases. The calculation unit 14 can also set the reaction time Tith to a value larger than the standard value when the driver is in an inattentive state. In addition, when information about the driver such as a state of tension and a state of health is acquired by the monitoring device 50, the calculation unit 14 can also calculate the reaction time Tith based on the standard value and the information acquired by the monitoring device 50. The calculation unit 14 may calculate the reaction time Tith based on a combination of the standard value and a plurality of information that can be acquired by the monitoring device 50. In addition, the calculation unit 14 may set the standard value as the reaction time Tith.

The calculation unit 14 can calculate a jerk as the rate of change of the acceleration of the vehicle. The calculation unit 14 can calculate a position where the vehicle stops, as a stopping position during braking of the vehicle. The stopping position can be calculated from vehicle speed, deceleration, and the like. A distance from a position where braking is started to the stopping position is a braking distance. The calculation unit 14 can predict a forward and backward acceleration of the vehicle at the point when the vehicle reaches the stopping position. The calculation unit 14 can calculate a forward and backward acceleration at the stopping position based on a required jerk.

The calculation unit 14 calculates an extended distance Di1 during execution of the reduction control. The calculation unit 14 repeatedly calculates the extended distance Di1 at predetermined intervals. When it is assumed that the reduction control is started from the point of calculation of the extended distance Di1, the extended distance Di1 is an estimated value of a distance by which the braking distance when the braking force is reduced by the execution of the reduction control is extended than the braking distance when the reduction control is not executed. For example, the extended distance Di1 can be calculated as follows. First, the calculation unit 14 calculates the braking distance when the reduction control is executed, as a first braking distance. In addition, the calculation unit 14 calculates the braking distance when the reduction control is not executed, as a second braking distance. Then, the calculation unit 14 calculates a difference between the first braking distance and the second braking distance as the extended distance Di1.

The calculation unit 14 calculates the extended distance Di1 such that the extended distance Di1 becomes longer when the operation amount BR is reduced during braking, namely, when the driver steps back on the braking operation member than when the operation amount BR is not reduced. The calculation unit 14 calculates the extended distance Di1 such that the extended distance Di1 becomes shorter when the operation amount BR is increased during braking, namely, when the driver depresses the braking operation member than when the operation amount BR is not increased.

The calculation unit 14 calculates a shortened distance Di2 during execution of the increase control. The calculation unit 14 repeatedly calculates the shortened distance Di2 at predetermined intervals. The shortened distance Di2 is an estimated value of a distance by which the braking distance when the braking force is increased by the execution of the increase control is shortened than the braking distance when the increase control is not executed. The shortened distance Di2 can be calculated based on an increase value of the braking force increased with respect to the required braking force and on the continuation time of the increase control. For example, the shortened distance Di2 is calculated as a longer distance as the increase value of the braking force is increased. The shortened distance Di2 is calculated as a longer distance as the continuation time of the increase control is increased. Incidentally, although details will be described later, the calculation unit 14 executes a processing to suppress the increase in the shortened distance Di2 or to reduce the shortened distance Di2 depending on conditions.

Details of the increase control and the reduction control will be described.

When the increasing unit 12 starts the increase control, the increasing unit 12 starts to calculate an elapsed time Ti1 as a continuation time of the increase control. The elapsed time Ti1 may start to count from the elapse of a certain period after the starting point of the increase control, in consideration of a response delay from the start of the increase control until the braking force applied to the wheel is actually increased. In this case, the time from the starting point to the elapse of the certain period is considered as waiting time.

The increasing unit 12 increases the braking force such that a difference between the extended distance Di1 and the shortened distance Di2 becomes less than a specified determination value α until the continuation time of the increase control reaches the reaction time Tith. The determination value α is a determination value for determining whether the difference between the extended distance Di1 and the shortened distance Di2 is reduced. One example of the determination value α is a value slightly larger than "0". For example, when the increasing unit 12 starts the increase control, the increasing unit 12 sets an increase value of the braking force with respect to the required braking force such that the difference between the extended distance Di1 and the shortened distance Di2 becomes less than the determination value α at the point when the elapsed time Ti1 reaches the reaction time Tith.

When the operation amount BR is reduced during execution of the increase control, the increasing unit 12 reduces the braking force according to a reduction speed of the operation amount BR while maintaining the state where the braking amount is increased with respect to the required braking force. When the operation amount BR is increased during execution of the increase control, the increasing unit 12 increases the braking force according to an increase speed of the operation amount BR while maintaining the state where the braking amount is increased with respect to the required braking force.

The reducing unit 13 executes the reduction control according to a profile that specifies the reduction value of the braking force reduced below the required braking force and the reduction speed of the braking force. The reducing unit 13 sets the profile in which the braking force is controlled to reduce the amount of change in forward and backward acceleration when the vehicle stops. The reducing unit 13 sets the profile based on vehicle speed, deceleration, and the like when braking is started. When the reducing unit 13 starts the reduction control, the reducing unit 13 updates the profile based on vehicle speed, deceleration, and the like at the point when the reduction control is started. Namely, it can also be said that the profile is updated based on wheel speed at the point when the reduction control is started. The updated profile is not limited to changing the reduction value of the braking force and the reduction speed of the braking force, and changing the reduction value of the braking force, changing the reduction speed of the braking force, and the like can be considered.

The reducing unit 13 ends the reduction control when the vehicle stops. Incidentally, after the vehicle has stopped, the pre-stop control unit 11 executes holding control to apply a braking force for holding the state where the vehicle has stopped.

The flow of a processing executed by the pre-stop control unit 11 will be described with reference to FIGS. 2 to 4. A processing routine illustrated in FIG. 2 is executed during braking of the vehicle. This processing routine is repeatedly executed at predetermined intervals until the increase control is started.

When this processing routine is started, first, in step S101, the pre-stop control unit 11 determines whether execution conditions for the pre-stop braking control are satisfied. One example of the execution conditions will be described. Here, in the case where the target value of deceleration when the vehicle speed becomes lower than a specified start determination value due to braking of the vehicle is less than a predetermined value, the pre-stop control unit 11 determines that the execution conditions are satisfied. On the other hand, when the vehicle speed is the specified start determination value or more, the pre-stop control unit 11 determines that the execution conditions are not satisfied. In addition, when the target value of deceleration is the predetermined value or more, the pre-stop control unit 11 also determines that the execution conditions are not satisfied.

When the execution conditions for the pre-stop braking control are not satisfied (S101: NO), the pre-stop control unit 11 ends this processing routine. On the other hand, when the execution conditions for the pre-stop braking control are satisfied (S101: YES), the pre-stop control unit 11 proceeds with the process to step S102. In step S102, the pre-stop control unit 11 causes the increasing unit 12 to start the increase control. As a result, the braking force of the vehicle is increased above the required braking force. Thereafter, the pre-stop control unit 11 ends this processing routine.

Figure 3:
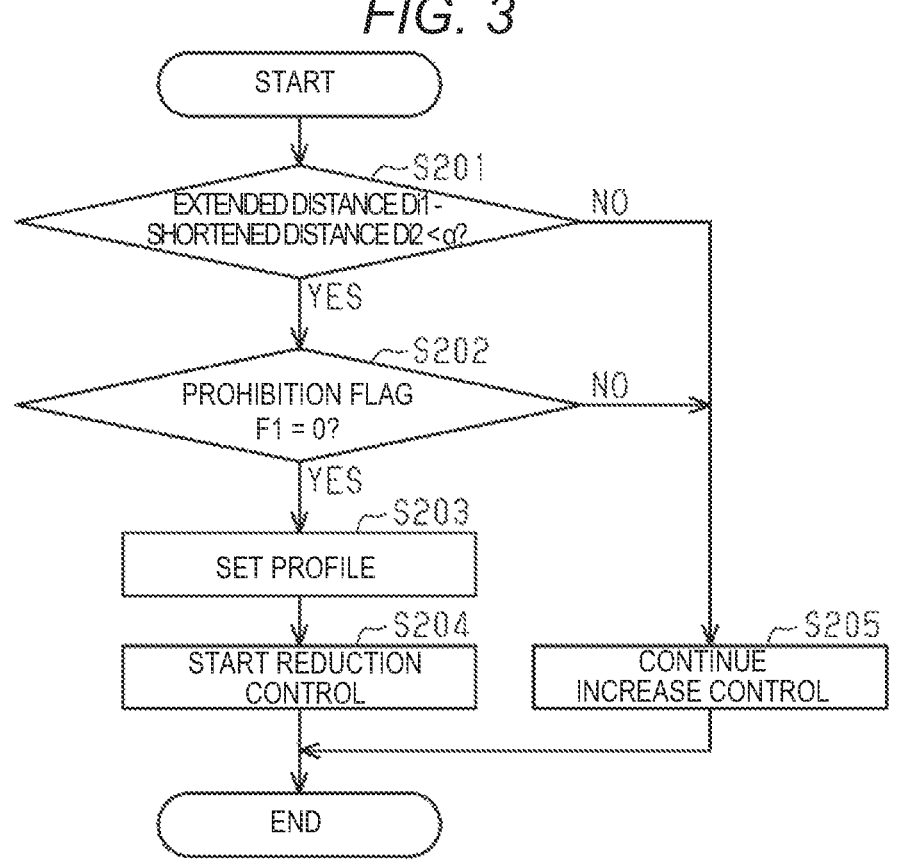
FIG. 3 is a flowchart illustrating the flow of a processing executed by the same braking control device during execution of increase control in the pre-stop braking control.

A processing routine illustrated in FIG. 3 is repeatedly executed at predetermined intervals by the pre-stop control unit 11 during execution of the increase control that is started in the process of step S102 of FIG. 2.

When this processing routine is started, first, in step S201, the pre-stop control unit 11 determines whether the difference between the extended distance Di1 and the shortened distance Di2 is less than the specified determination value α.

When the difference between the extended distance Di1 and the shortened distance Di2 is the determination value α or more (S201: NO), the pre-stop control unit 11 proceeds with the process to step S205. On the other hand, when the difference between the extended distance Di1 and the shortened distance Di2 is less than the determination value α (S201: YES), the pre-stop control unit 11 proceeds with the process to step S202.

In step S202, the pre-stop control unit 11 determines whether a prohibition flag F1 is "0". When the prohibition flag F1 is "0", the pre-stop control unit 11 allows the start of the reduction control. When the prohibition flag F1 is "1", the pre-stop control unit 11 prohibits the start of the reduction control. The prohibition flag F1 is set to "0" as an initial value. The prohibition flag F1 is set to "0" or "1" in a processing routine illustrated in FIG. 4 to be described later. The prohibition flag F1 is set to "0" that is an initial value when the vehicle stops. When the prohibition flag F1 is "1" (step S202: NO), the pre-stop control unit 11 proceeds with the process to step S205.

In step S205, the pre-stop control unit 11 causes the increasing unit 12 to continue to execute the increase control. Thereafter, the pre-stop control unit 11 ends this processing routine.

On the other hand, when the prohibition flag F1 is "0" in the process of step S202 (S202: YES), the pre-stop control unit 11 proceeds with the process to step S203.

In step S203, the pre-stop control unit 11 causes the reducing unit 13 to set a profile. The reducing unit 13 sets the profile using vehicle speed at this point. Thereafter, the pre-stop control unit 11 proceeds with the process to step S204.

In step S204, the pre-stop control unit 11 causes the increasing unit 12 to end the increase control, and causes the reducing unit 13 to start the reduction control. The reducing unit 13 starts the reduction control based on the profile set in the process of step S203. As a result, the braking force of the vehicle is reduced below the required braking force. Thereafter, the pre-stop control unit 11 ends this processing routine.

The processing routine illustrated in FIG. 4 is repeatedly executed at predetermined intervals by the pre-stop control unit 11 during execution of the increase control that is started in the process of step S102 of FIG. 2.

When this processing routine is started, first, in step S301, the pre-stop control unit 11 determines whether the elapsed time Ti1 is larger than the reaction time Tith. When the elapsed time Ti1 is the reaction time Tith or less (S301: NO), the pre-stop control unit 11 ends this processing routine. On the other hand, when the elapsed time Ti1 is larger than the reaction time Tith (step S301: YES), the pre-stop control unit 11 proceeds with the process to step S302.

In step S302, the pre-stop control unit 11 causes the calculation unit 14 to calculate a required jerk. The calculation unit 14 calculates the required jerk as the rate of change of the acceleration of the vehicle per unit time. Thereafter, the pre-stop control unit 11 proceeds with the process to step S303.

In step S303, the pre-stop control unit 11 causes the calculation unit 14 to calculate a forward and backward acceleration at the stopping position of the vehicle. The calculation unit 14 calculates the forward and backward acceleration at the stopping position as a predicted value estimated based on the required jerk. Thereafter, the pre-stop control unit 11 proceeds with the process to step S304.

In step S304, the pre-stop control unit 11 determines whether the forward and backward acceleration at the stopping position is within an allowable range. When the magnitude of the forward and backward acceleration is less than an allowable value, the pre-stop control unit 11 determines that the forward and backward acceleration is within the allowable range. On the other hand, when the magnitude of the forward and backward acceleration is the allowable value or more, the pre-stop control unit 11 determines that the forward and backward acceleration is outside the allowable range. The allowable value is set to a value calculated in advance by an experiment or the like, so as to determine whether the amount of change in forward and backward acceleration when the vehicle stops is suppressed to a low level.

When the forward and backward acceleration is within the allowable range (step S304: YES), the pre-stop control unit 11 proceeds with the process to step S305. In step S305, the pre-stop control unit 11 sets the prohibition flag F1 to "1". As a result, the reduction control is not started. Thereafter, the pre-stop control unit 11 ends this processing routine.

On the other hand, when the forward and backward acceleration is outside the allowable range (step S304: NO), the pre-stop control unit 11 proceeds with the process to step S306. In step S306, the pre-stop control unit 11 sets the prohibition flag F1 to "0". Thereafter, the pre-stop control unit 11 ends this processing routine.

Next, a calculation process for the shortened distance Di2 executed by the calculation unit 14 will be described with reference to FIG. 5. The calculation process is repeatedly executed at predetermined intervals by the calculation unit 14 during execution of the increase control that is started in the process of step S102 of FIG. 2.

When this processing routine is started, first, in step S401, the calculation unit 14 determines whether the elapsed time Ti1 is larger than the reaction time Tith. The reaction time Tith corresponds to the specified determination value. When the elapsed time Ti1 is larger than the reaction time Tith (step S401: YES), the calculation unit 14 proceeds with the process to step S402.

In step S402, the calculation unit 14 stops adding the shortened distance Di2. Thereafter, the calculation unit 14 proceeds with the process to step S403. In step S403, the calculation unit 14 starts to subtract the shortened distance Di2. Thereafter, the calculation unit 14 ends this processing routine.

Here, one example of a flow in which the calculation unit 14 calculates the shortened distance Di2 will be described. The calculation unit 14 calculates a value obtained by subtracting a subtractive value from a base value, as the shortened distance Di2. The base value is calculated based on the increase value of the braking force increased with respect to the required braking force by the execution of the increase control and on the time that the increase control is continued. The calculation unit 14 increases the shortened distance Di2 by increasing the base value during execution of the increase control. The subtractive value is calculated as a value that reduces the shortened distance Di2 as the increase control is continued. For example, the calculation unit 14 sets the value of the shortened distance Di2 at the point when the reaction time Tith is traced back from the point when the subtractive value is calculated, as the subtractive value. The calculation unit 14 can also set a constant set in advance, as the subtractive value.

Returning to FIG. 5, stopping adding the shortened distance Di2 in the process of step S402 is a process of stopping calculating the base value for the shortened distance Di2. When the process of step S402 is executed, the calculation unit 14 holds the previously calculated base value, and calculates the shortened distance Di2 using the held base value. Namely, when the process of step S402 is executed, the increase in the shortened distance Di2 is suppressed. Subtracting the shortened distance Di2 in the process of step S403 is a process of starting to calculate the subtractive value of the shortened distance Di2. When the process of step S403 is executed, the calculation unit 14 starts to calculate the subtractive value. Incidentally, until the process of step S403 is executed, the calculation unit 14 sets the subtractive value to "0".

On the other hand, when the elapsed time Ti1 is the reaction time Tith or less in the process of step S401 (step S401: NO), the calculation unit 14 proceeds with the process to step S404. In step S404, the calculation unit 14 continues to add the shortened distance Di2. Namely, the calculation unit 14 continues to calculate the base value for the shortened distance Di2. Thereafter, the calculation unit 14 ends this processing routine.

Actions and effects of the present embodiment will be described.

FIGS. 6A-6D, 7A-7D, 8A-8D and 9A-9D illustrate a transition of the braking force controlled by the execution of the pre-stop braking control. In the example illustrated in FIGS. 6A-6D, the operation amount BR is not changed during execution of the pre-stop braking control. In the example illustrated in FIGS. 6A-6D, the increase control is started from time t11. The calculation of the elapsed time Ti1 is started from time t12. A period from time t11 to time t12 indicates waiting time. A period from time t12 to time t13 corresponds to the reaction time Tith. The vehicle has stopped at time t15.

In FIG. 6A, the extended distance Di1 and the shortened distance Di2 are displayed as variable distances. A solid line illustrated in FIG. 6A indicates the extended distance Di1. A dashed line illustrated in FIG. 6A indicates the shortened distance Di2.

As illustrated in FIG. 6B, the vehicle speed gradually decreases during braking. The vehicle speed decreases to "0" at time t15 that the vehicle stops.

A solid line in FIG. 6C indicates the forward and backward acceleration of the vehicle. A dashed line in FIG. 6C is a comparative example illustrating forward and backward acceleration when the increase control is not executed. Namely, the dashed line in FIG. 6C indicates forward and backward acceleration when it is assumed that the braking force is controlled with the required braking force according to the operation amount BR as a target value.

A braking force correction amount illustrated in FIG. 6D is an increase or reduction value for the required braking force. When the braking force correction amount is "0", the braking force is equal to the required braking force. When the braking force correction amount is a positive value, the braking force is increased above the required braking force. When the braking force correction amount is a negative value, the braking force is reduced below the required braking force.

When the increase control is started at time t11, as illustrated in FIG. 6D, the braking force is increased. As a result, as illustrated in FIG. 6C, the forward and backward acceleration is smaller than that in the comparative example illustrated by the dashed line.

As illustrated in FIG. 6A, the shortened distance Di2 is gradually increased after time t12 by the execution of the increase control. Accordingly, after time t12, the difference between the extended distance Di1 and the shortened distance Di2 is gradually reduced. At time t13, the difference between the extended distance Di1 and the shortened distance Di2 is reduced, and it is determined that the difference is less than the determination value α (S201: YES). At this time, since the elapsed time Ti1 does not exceed the reaction time Tith (S301: NO), the prohibition flag F1 has an initial value of "0". Namely, the profile in the reduction control is set (S203), and the increase control is ended and the reduction control is started (S204).

When the reduction control is started at time t13, as illustrated in FIG. 6D, the braking force is reduced. The braking force is maintained constant in a period from time t14 to time t15. As a result, as illustrated in FIG. 6C, the forward and backward acceleration is increased to approach "0". When the vehicle stops at time t15, the amount of change in the forward and backward acceleration is reduced. When the vehicle stops at time t15, the holding control is executed by the pre-stop control unit 11, and as illustrated in FIG. 6D, the braking force is increased.

According to the braking control device 10, the increase control is executed before the reduction control is executed in the pre-stop braking control. Accordingly, it is possible to suppress the increase in the extended distance Di1. Namely, it is possible to reduce the amount of change in forward and backward acceleration immediately before the vehicle stops, while suppressing the extension of the braking distance.

In the braking control device 10, until the reaction time Tith elapses, the braking force is increased by the increase control such that the difference between the extended distance Di1 and the shortened distance Di2 becomes less than the determination value α. Namely, the period in which the braking force is increased does not exceed the reaction time Tith. For this reason, it is difficult for the driver of the vehicle to recognize that the braking force is increased. In other words, even when the braking force is increased by the increase control, it is difficult for the driver to feel a deviation between an operation of the driver himself or herself and the acceleration of the vehicle. If the driver recognizes the increase in the braking force, there is a possibility that the driver steps back on the braking operation member to reduce the operation amount BR. On the other hand, according to the braking control device 10, it is possible to suppress the change in the operation amount BR caused by the driver during execution of the increase control.

The example illustrated in FIGS. 7A-7D differs from the example illustrated in FIGS. 6A-6D in that the operation amount BR is changed during execution of the pre-stop braking control. In the example illustrated in FIGS. 7A-7D, the increase control is started at time t21, and then the driver steps back on the braking operation member. Namely, the operation amount BR is reduced, and as illustrated by a dashed line in FIG. 7C, the forward and backward acceleration corresponding to the operation amount BR is gradually increased.

In the example illustrated in FIGS. 7A-7D, the calculation of the elapsed time Ti1 is started from time t21. A period from time t21 to time t22 indicates waiting time. A period from time t22 to time t23 corresponds to the reaction time Tith. The vehicle has stopped at time t24.

A chain double-dashed line illustrated in FIG. 7A is a comparative example illustrating the extended distance Di1 when the operation amount BR is not changed during execution of the pre-stop braking control. In the comparative example illustrated by the chain double-dashed line, similarly to the example illustrated in FIGS. 6A-6D, the difference between the extended distance Di1 and the shortened distance Di2 at time t23 that the reaction time Tith has elapsed becomes less than the determination value α.

On the other hand, as illustrated by a solid line in FIG. 7A, since the operation amount BR is reduced during execution of the increase control, the actual extended distance Di1 is calculated as a value larger than that in the comparative example illustrated by the chain double-dashed line. For this reason, at the point of time t23, the difference between the extended distance Di1 and the shortened distance Di2 is large, and the difference is the determination value α or more. Namely, the increase control is continued even after time t23 (S205).

After time t23, since the elapsed time Ti1 is larger than the reaction time Tith (S401: YES), adding the shortened distance Di2 is stopped (S402), and subtracting the shortened distance Di2 is started (S403). For this reason, as illustrated by a dashed line in FIG. 7A, the shortened distance Di2 is gradually reduced after time t23. After time t23, the difference between the extended distance Di1 and the shortened distance Di2 does not become less than the determination value α, and the extended distance Di1 and the shortened distance Di2 are in transition. For this reason, the reduction control is not started, and the vehicle has stopped at time t24. As illustrated in FIG. 7C, the amount of change in the forward and backward acceleration when stopping is small.

As illustrated in FIG. 7D, the state where the braking force increased after the increase control is started at time t21 continues in a period up to time t24. Incidentally, the braking force after the vehicle has stopped is maintained in a period from time t24 to time t25, and then is lowered to the required braking force by the pre-stop control unit 11.

As in the example illustrated in FIGS. 7A-7D, the fact that the operation amount BR is changed during execution of the pre-stop braking control can be considered as the case where the driver expresses an intention to move the stopping position further away compared to when the pre-stop braking control is not executed, or the case where the driver himself or herself performs an operation to stop the vehicle with good feeling. Namely, when the forward and backward acceleration is changed by the intervention of the pre-stop braking control during braking, there is a possibility that the changed forward and backward acceleration does not match the driver's intention. There is also a possibility that the driver feels uncomfortable with the changed forward and backward acceleration. Therefore, in the braking control device 10, even when the elapsed time Ti1 becomes larger than the reaction time Tith, in the case where the difference between the extended distance Di1 and the shortened distance Di2 is larger than the determination value α or more and the increase control is continued, the shortened distance Di2 is subtracted. Accordingly, when the braking operation member is operated such that the extended distance Di1 becomes "0" at the point when the vehicle reaches the stopping position, it is difficult that the difference between the extended distance Di1 and the shortened distance Di2 becomes less than the determination value α. Then, since the braking operation member is operated such that the extended distance Di1 becomes "0" at the point when the stopping position is reached, it is possible to reduce the amount of change in the forward and backward acceleration when stopping as illustrated in FIG. 7C, without executing the reduction control. In such a manner, in the braking control device 10, depending on how the driver operates the braking operation member during execution of the increase control, it is possible to perform braking mainly based on an operation by the driver, without executing the reduction control.

In the example illustrated in FIGS. 8A-8D, the operation amount BR is changed during execution of the pre-stop braking control, but the example illustrated in FIGS. 8A-8D differs from the example illustrated in FIGS. 7A-7D in how the operation amount BR is changed. In the example illustrated in FIGS. 8A-8D, the increase control is started at time t31, and then the driver steps back on the braking operation member. However, the amount of reduction in the operation amount BR by stepping back is smaller compared to the example illustrated in FIGS. 7A-7D. For this reason, as illustrated by a dashed line in FIG. 8C, the slope of the forward and backward acceleration corresponding to the operation amount BR is smaller than the slope of the forward and backward acceleration in FIG. 7C. Examples of such a case include the case where the correction of the stopping position by an operation of the driver is minimal, or the case where since the driver's skill in driving the vehicle is not sufficient, the stopping of the vehicle according to an operation of the driver causes bad feeling.

In such an example illustrated in FIGS. 8A-8D, as illustrated in FIG. 8A, the difference between the extended distance Di1 and the shortened distance Di2 is the determination value α or more at the point of time t33 that the reaction time Tith has elapsed from time t32, but the difference between the extended distance Di1 and the shortened distance Di2 becomes less than the determination value α at time t34 after time t33. For this reason, the reduction control is started at time t34. As illustrated in FIG. 8D, the braking force is reduced in a period from time t34 to time t35 by the reduction control. The braking force is maintained constant in a period from time t35 to time t36. The reduction control is ended at time t36 that the vehicle stops. The holding control is executed after time t36.

Incidentally, after time t33, since the elapsed time Ti1 is larger than the reaction time Tith (S301: YES), the forward and backward acceleration at the stopping position of the vehicle is estimated (S303). In the example illustrated in FIGS. 8A-8D, the forward and backward acceleration is estimated as a value outside the allowable range. For this reason, the prohibition flag F1 is set to "0" (S306). Since the prohibition flag F1 is "0" (S202: YES), the reduction control is not prohibited, and the reduction control is started at time t34 that the difference between the extended distance Di1 and the shortened distance Di2 becomes less than the determination value α.

If the forward and backward acceleration at the point of time t34 is estimated as a value within the allowable range, the prohibition flag F1 is set to "1" (S305). In this case, since the prohibition flag F1 is "1" (S202: NO), the increase control is continued without starting the reduction control.

Namely, similarly to the example illustrated in FIGS. 7A-7D, the increase control is continued until the vehicle stops. In such a manner, even when the difference between the extended distance Di1 and the shortened distance Di2 is less than the determination value α, in the case where the forward and backward acceleration at the stopping position of the vehicle is estimated as a value within the allowable range, the increase control can be continued to prevent the starting of the reduction control.

In the braking control device 10, the profile is updated at the point when the reduction control is started. For this reason, in the example illustrated in FIGS. 8A-8D, the reduction value of the braking force is smaller compared to the example illustrated in FIGS. 6A-6D. In such a manner, in the braking control device 10, the profile is calculated based on the vehicle speed at the point when the reduction control is started, so that even when the time that the reduction control is started is changed, the amount of change in the forward and backward acceleration immediately before the vehicle stops can be reduced.

In the braking control device 10, when the difference between the extended distance Di1 and the shortened distance Di2 becomes less than the determination value α, the increase control is ended and the reduction control is started. An operation of the driver is reflected in the calculation of the extended distance Di1. In addition, when the operation amount BR is changed during execution of the increase control, the magnitude of the braking force is affected by the operation amount BR. Namely, the shortened distance Di2 indicating a distance shortened by the execution of the increase control varies due to the influence of the operation amount BR. Thus, the operation amount BR is reflected in the extended distance Di1 and the shortened distance Di2. For this reason, when the operation amount BR is changed as illustrated in FIGS. 8A-8D as one example, it is possible to reflect an operation by the driver of the vehicle at the time that the reduction control is stated. Accordingly, the braking distance that reflects the operation of the driver is easily realized.

Incidentally, the disclosure is not limited to an operation of the braking operation member by the driver, and even when the braking force is changed by the intervention of control other than the pre-stop braking control, according to the braking control device 10 that changes the time that the reduction control is started, by means of the extended distance Di1 and the shortened distance Di2, the reduction control can be started to reduce the amount of change in the forward and backward acceleration immediately before stopping.

In the example illustrated in FIGS. 9A-9D, the increase control is started at time t41, and then the driver steps back on the braking operation member. Namely, the operation amount BR is increased, and as illustrated by a dashed line in FIG. 9C, the forward and backward acceleration corresponding to the operation amount BR is gradually reduced.

In the example illustrated in FIGS. 9A-9D, the calculation of the elapsed time Ti1 is started from time t41. A period from time t41 to time t42 indicates waiting time. A period from time t42 to time t44 corresponds to the reaction time Tith. The vehicle has stopped at time t46.

A chain double-dashed line illustrated in FIG. 9A is a comparative example illustrating the extended distance Di1 when the operation amount BR is not changed during execution of the pre-stop braking control. In the comparative example illustrated by the chain double-dashed line, similarly to the example illustrated in FIGS. 6A-6D, the difference between the extended distance Di1 and the shortened distance Di2 at time t44 that the reaction time Tith has elapsed becomes less than the determination value α.

On the other hand, as illustrated by a solid line in FIG. 9A, since the operation amount BR is increased during execution of the increase control, the actual extended distance Di1 is calculated as a value smaller than that in the comparative example illustrated by the chain double-dashed line. For this reason, the difference between the extended distance Di1 and the shortened distance Di2 is less than the determination value α at time t43 before time t44. Namely, the reduction control is started at time t43. As illustrated in FIG. 9D, the braking force is reduced in a period from time t43 to time t45 by the reduction control. The braking force is maintained constant in a period from time t45 to time t46. The reduction control is ended at time t46 that the vehicle stops. The holding control is executed after time t46.

Incidentally, in the example illustrated in FIGS. 9A-9D, due to the depression of the braking operation member during execution of the increase control, the forward and backward acceleration greatly deviates from "0" as illustrated from time t41 to t43. In the reduction control in the example illustrated in FIGS. 9A-9D, in order to reduce the amount of change in the forward and backward acceleration when the vehicle stops, the profile is calculated such that the reduction value of the braking force is larger compared to the example illustrated in FIGS. 6A-6D. The profile in the reduction control is updated by the reducing unit 13 at the point when the reduction control is started.

As in the example illustrated in FIGS. 9A-9D, even when the operation amount BR is increased during execution of the increase control, according to the braking control device 10 that changes the time that the reduction control is started, by means of the extended distance Di1 and the shortened distance Di2, the reduction control can be executed to reduce the amount of change in the forward and backward acceleration when the vehicle stops.

The present embodiment can be changed and implemented as follows. The present embodiment and the following modification examples can be implemented in combination without technically contradicting each other.

In the embodiment, as illustrated in FIG. 5, when the elapsed time Ti1 is larger than the reaction time Tith, the shortened distance Di2 is subtracted while the increase control is continued. Instead, the shortened distance Di2 may be held constant after the elapsed time Ti1 has exceeded the reaction time Tith. Alternatively, the increase speed of the shortened distance Di2 may be reduced while continuing to increase the shortened distance Di2. Namely, after the elapsed time Ti1 has exceeded the reaction time Tith, the increase in the shortened distance Di2 may be suppressed or the shortened distance Di2 may be reduced.

For example, instead of executing the process of step S402 and the process of step S403 in FIG. 5, the process of step S402 or the process of step S403 may be executed.

In the embodiment, when there is a variation in the operation amount BR during execution of the increase control, the variation in the operation amount BR is reflected in the adjustment of the extended distance Di1 and the braking force. The braking control device 10 may determine whether to reflect the variation in the operation amount BR, based on information acquired by the monitoring device 50. For example, when there is a possibility that an operation by the driver is an erroneous operation, the variation in the operation amount BR may not be reflected. In addition, when it can be inferred that the driver is unfamiliar with driving the vehicle, it is possible to reduce the degree of reflection of the variation in the operation amount BR.

For example, the braking control device may be configured as follows as long as the braking control device can execute, in the vehicle that decelerates due to a braking operation by the driver, the reduction control to reduce the braking force applied to the vehicle regardless of the braking operation of the driver when the vehicle is about to stop, and the increase control to increase the braking force applied to the vehicle regardless of the braking operation of the driver in a period before the execution period of the reduction control, in order to compensate for the braking distance of the vehicle extended by the execution of the reduction control.

For example, the braking control device may include an accumulation unit that accumulates the operation amount BR of the braking operation member before the execution of the reduction control is started, and a control unit that starts the reduction control based on an accumulated value of the operation amount BR.

The pre-stop braking control in the embodiment is not limited to being executed during braking when the vehicle moves forward, and can also be applied during braking when the vehicle moves backward.

The invention claimed is:

1. A braking control device that executes pre-stop braking control to adjust a braking force of a vehicle when the vehicle is stopped by braking in a case where a braking operation member is operated by a driver of the vehicle, the braking control device comprising:

a reducing unit that executes reduction control to reduce the braking force applied to the vehicle, below a required braking force that is a braking force corresponding to an operation amount of the braking operation member, during the pre-stop braking control;

an increasing unit that executes increase control to increase the braking force above the required braking force before the reduction control is started during the pre-stop braking control; and a calculation unit that calculates a shortened distance that is an estimated value of a distance by which a braking distance when the braking force is increased by the execution of the increase control is shortened than a braking distance when the increase control is not executed, and an extended distance that is an estimated value of a distance by which a braking distance when the braking force is reduced by the execution of the reduction control is extended than a braking distance when the reduction control is not executed, during the execution of the increase control, wherein the calculation unit calculates the extended distance such that the extended distance becomes longer when the operation amount is reduced during the braking of the vehicle than when the operation amount is not reduced, and when a difference between the extended distance and the shortened distance is less than a determination value, the reducing unit starts the reduction control.

2. The braking control device according to claim 1, wherein the reducing unit executes the reduction control according to a profile that specifies an amount of reduction in the braking force in the reduction control and a reduction speed of the braking force in the reduction control, and sets the profile based on a wheel speed of the vehicle at a point when the reduction control is started.

3. The braking control device according to claim 2, wherein when the operation amount is reduced during the execution of the increase control after a continuation time of the increase control had exceeded a specified determination value, the increasing unit reduces the braking force while maintaining a state where the braking force is larger than the required braking force, and when the difference between the extended distance and the shortened distance is the determination value or more, the reducing unit does not start the reduction control.

4. The braking control device according to claim 2, wherein the calculation unit predicts a forward and backward acceleration of the vehicle at a point when the vehicle is stopped by braking, based on at least one of the operation amount and the required braking force, when the operation amount is reduced during the execution of the increase control, the increasing unit reduces the braking force while maintaining a state where the braking force is larger than the required braking force, and when a magnitude of a predicted value of the forward and backward acceleration at the point when the vehicle is stopped by braking is less than a specified allowable value, the increasing unit continues the increase control even when the difference between the extended distance and the shortened distance becomes less than the determination value, and when the magnitude of the predicted value of the forward and backward acceleration at the point when the vehicle is stopped by braking is less than the allowable value, the reducing unit does not start the reduction control even when the difference between the extended distance and the shortened distance becomes less than the determination value.

5. A braking control device that, in a vehicle that decelerates due to an operation of a braking operation member by a driver of the vehicle, executes reduction control to reduce a braking force applied to the vehicle regardless of the operation of the braking operation member when the vehicle is about to stop, in order to suppress a behavior of the vehicle associated with a stopping of the vehicle, and increase control to increase the braking force applied to the vehicle regardless of the operation of the braking operation member in a period before an execution period of the reduction control, in order to compensate for a braking distance of the vehicle extended by the execution of the reduction control, the braking control device comprising:

an accumulation unit that accumulates an operation amount of the braking operation member before the execution of the reduction control is started; and a control unit that starts the reduction control based on the operation amount of the braking operation member accumulated by the accumulation unit.

6. The braking control device according to claim 1, wherein the calculation unit predicts a forward and backward acceleration of the vehicle at a point when the vehicle is stopped by braking, based on at least one of the operation amount and the required braking force, when the operation amount is reduced during the execution of the increase control, the increasing unit reduces the braking force while maintaining a state where the braking force is larger than the required braking force, and when a magnitude of a predicted value of the forward and backward acceleration at the point when the vehicle is stopped by braking is less than a specified allowable value, the increasing unit continues the increase control even when the difference between the extended distance and the shortened distance becomes less than the determination value, and when the magnitude of the predicted value of the forward and backward acceleration at the point when the vehicle is stopped by braking is less than the allowable value, the reducing unit does not start the reduction control even when the difference between the extended distance and the shortened distance becomes less than the determination value.

\* \* \* \* \*